Sept. 16, 1952     B. O. WAGNER     2,610,645

AUTOMATIC DRAIN VALVE

Filed Sept. 22, 1947

INVENTOR.
BRUCE O. WAGNER
BY William R. Lane
ATTORNEY

Patented Sept. 16, 1952

2,610,645

UNITED STATES PATENT OFFICE 2,610,645

AUTOMATIC DRAIN VALVE

Bruce O. Wagner, Inglewood, Calif., assignor to North American Aviation, Inc.

Application September 22, 1947, Serial No. 775,529

4 Claims. (Cl. 137—188)

This invention pertains to an automatic dump or bleed valve and particularly to a valve for discharging excess condensate accumulated in an air line.

The invention is adapted for use in connection with an air line connecting a source of pressure with an enclosure and particularly in the pressurization of airplane cabins where air is obtained from the final stages of the compressors of jet engines. In that connection the temperature of the air frequently falls below its dew point with the resulting formation of liquid condensate in the duct system.

It is therefore an object of this invention to provide an arrangement whereby such liquid may be eliminated from the duct system without affecting the pressure of the air in the ducts or the cabin connected thereto.

Other objects of invention will become apparent from the following description taken in connection with the accompanying drawings in which.

Figure 1:
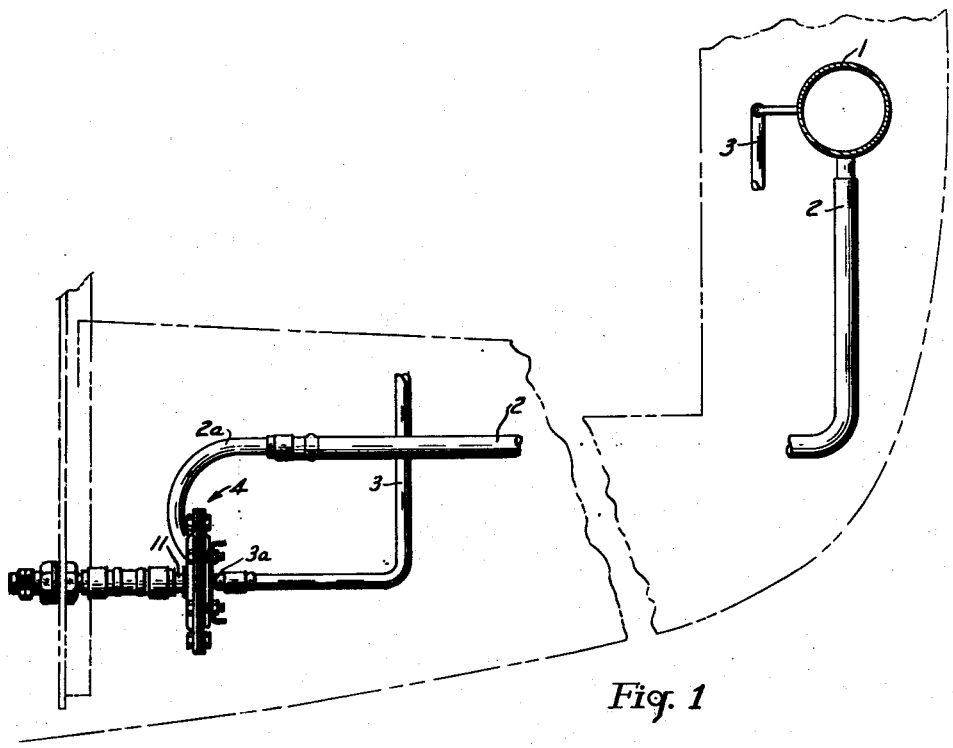
Fig. 1 is an elevational view of an arrangement embodying the invention.
Figure 2:
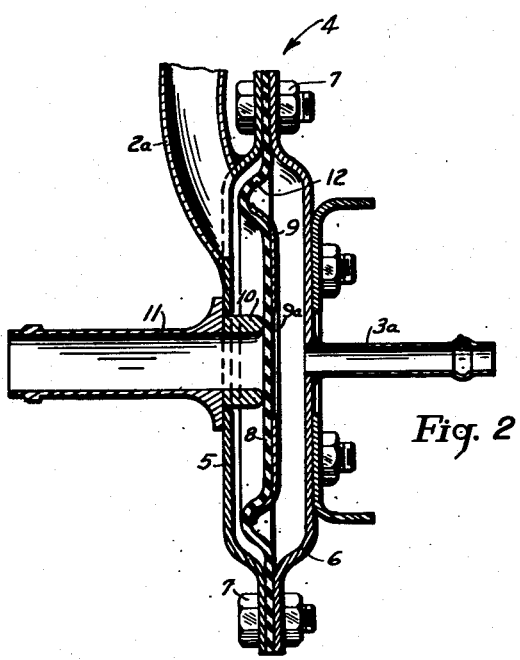
Fig. 2 is a cross-sectional view of the valve comprising the invention.

Referring to the drawings, duct 1 constitutes a part of the system for conducting pressurized fluid, such as air, from a source, such as the compressors of a jet engine, to its destination, such as a pressurized cabin of an airplane. Since the source of air may contain considerable moisture, and conveyance of the same may result in its being cooled to the point of precipitation of moisture in the duct system, it becomes desirable to eject such accumulated moisture from the duct system to the outside of the airplane without affecting the pressure of the air in the ducts or the pressurized cabin. Accordingly, there is connected to the duct 1, preferably at a low point in the duct system, a drain pipe 2 and a pressure pipe 3. These are in turn connected to a valve, referred to generally as 4, having a stub 2a adapted to connect with pipe 2 and a stub 3a adapted to connect to the pipe 3. Stub elements 2a and 3a are connected respectively to a pair of circular dish-shaped elements 5 and 6 constituting a casing and fastened together by bolts 7 forming a part of the arrangement. Also fastened to the dish-shaped elements is a diaphragm member 8 formed of rubber or other suitable material and provided with a stiffening element 9. This plate 9 prevents unwanted bulging of the diaphragm upon exertion of pressure from accumulated liquid condensate. The plate is provided with a circular cut-out portion 9a in proximity to and somewhat larger than the seat 10. This facilitates unseating of the valve when a predetermined head of liquid is accumulated. The diaphragm member divides the casing into two compartments and is adapted to abut seat portion 10 of a discharge tube 11 suitably attached to and carried by element 5. The compartment embodying tube 11 may be referred to as the discharge, and the other as the pressure compartment. The force on the diaphragm is normally unbalanced, even though both sides are connected to duct 1, by reason of the fact that the area against which pressure from the cabin line is exerted is less on the side where the diaphragm seats against portion 10 than on the opposite side. Further, the diaphragm is flexed as at 12 to cause it normally to remain in closed position. Accordingly, the diaphragm remains closed until unbalanced by pressure resulting from the accumulation of liquid condensate in the part 5. Diaphragm 8 is thereupon unseated, permitting the liquid to be discharged through tube 11 without appreciably affecting the pressure in the duct 1. Upon relieving the overbalanced pressure on the diaphragm 8 by discharge of the accumulated liquid, the diaphragm will move back to seating position.

In the operation of the device, pressure in line 1 exerted through ducts 2 and 3 to opposite sides of the diaphragm 8 causes the diaphragm to remain in contact with seat 10. This occurs by reason of the fact that the area on the diaphragm encompassed by seat 10 is at a lower pressure than on the remaining portions of the diaphragm. Accordingly, the diaphragm remains in closed position until a head of water in excess of a predetermined amount collects in 2a and 2. The diaphragm area encompassed by seat 10 and the flexure inhibited in the diaphragm may be so selected that the diaphragm will open at about a 12-inch head of water and close upon reaching about a 5-inch head of water, pressure in the air line and cabin being at 6.55 p. s. i. These heads and pressures can be varied depending upon conditions encountered and results desired. When the excess liquid has been drained off and the head lowered to a predetermined amount, the total pressure in the closed side of the diaphragm will overcome that exerted on the opposite side and the diaphragm will move to closed position.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A bleed valve for discharging liquid from a pressurized system without loss of pressure, comprising a casing; a diaphragm of flexible material dividing said casing into two compartments; means for connecting each of said compartments to said system, one connection also serving to conduct liquid to one of said compartments; and a discharge tube associated with said one compartment; said diaphragm being flexed at its outer periphery to urge its central portion into sealing engagement with said discharge tube when both compartments are unpressurized, said central portion being also held in sealing engagement when said compartments are pressurized by the difference in pressure on said diaphragm because of the lack of pressure on the portion of the diaphragm engaging said discharge opening, said diaphragm moving into open position when the pressure of collected excess fluid in said one compartment exceeds that of the other compartment plus the flexure stress of said diaphragm, said diaphragm again moving into closed position upon discharge of such excess fluid.

2. A device as recited in claim 1 in which the area of said discharge tube is a substantial portion of the area of said diaphragm.

3. A device as recited in claim 1 and further including a stiffener member associated with said diaphragm, said stiffener member being curved at its outer edge in the direction of said discharge tube to flex said diaphragm.

4. A bleed valve for discharging liquid from a pressurized system without loss of pressure, comprising a casing; a diaphragm means forming said casing into two compartments; means for connecting each of said compartments to said system, one connection also serving to conduct liquid to one of said compartments; low pressure discharge means associated with said one compartment, said diaphragm being flexed at its outer periphery to be urged to closed position with respect to said discharge means; the size of said discharge means being proportioned with respect to the area of said diaphragm so as to respond to the pressure of collected liquid in said one compartment in excess of a predetermined amount, by moving said diaphragm to open position, said diaphragm again moving to closed position upon discharge of such excess liquid; and a stiffener member associated with said diaphragm, said stiffener member having a portion removed therefrom at the position of contact of the diaphragm with said discharge means.

BRUCE O. WAGNER.

REFERENCES CITED

The following references are of record in the file of this patent:

UNITED STATES PATENTS

| Number | Name | Date |
|---|---|---|
| 602,657 | Franklin | Apr. 19, 1898 |
| 1,248,650 | Gustafson et al. | Dec. 4, 1917 |
| 2,351,047 | Hughes | June 13, 1944 |
| 2,380,983 | Mock | Aug. 7, 1945 |
| 2,444,163 | Kocmich | June 29, 1948 |

FOREIGN PATENTS

| Number | Country | Date |
|---|---|---|
| 400,092 | Great Britain | of 1933 |